US007428696B2

(12) United States Patent  
Shin

(10) Patent No.: US 7,428,696 B2  
(45) Date of Patent: Sep. 23, 2008

(54) SYSTEM AND METHOD FOR TIME SYNCHRONIZATION BETWEEN MULTIMEDIA CONTENT AND SEGMENT METADATA

(75) Inventor: Hyo-seop Shin, Seoul (KR)

(73) Assignee: Samsung Electronics Co. Ltd., Suwon (KR)

( * ) Notice: Subject to any disclaimer, the term of this patent is extended or adjusted under 35 U.S.C. 154(b) by 274 days.

(21) Appl. No.: 10/879,594

(22) Filed: Jun. 30, 2004

(65) Prior Publication Data

US 2004/0267738 A1 Dec. 30, 2004

(30) Foreign Application Priority Data

Jun. 30, 2003 (KR) .................... 10-2003-0043520

(51) Int. Cl.
*G06F 15/00* (2006.01)
*G06F 17/00* (2006.01)

(52) U.S. Cl. .................... 715/203; 715/201; 701/213

(58) Field of Classification Search ............... 715/500, 715/500.1, 522, 203, 201; 701/213
See application file for complete search history.

(56) References Cited

U.S. PATENT DOCUMENTS 5,319,374 A * 6/1994 Desai et al. .................. 342/387
6,637,029 B1 * 10/2003 Maissel et al. ............... 725/46

(Continued)

FOREIGN PATENT DOCUMENTS

| FR | 2 834 176 | 6/2003 |
| JP | 2002-344909 A | 11/2002 |
| JP | 2003-61023 A | 2/2003 |
| KR | 2002-0019519 A | 3/2002 |
| KR | 2002-0063830 A | 8/2002 |

OTHER PUBLICATIONS

"The TV-Anytime Forum, Specification Series: S-2, on: System Description (Informative with Normative Appendix B)," Document SP002v13, Feb. 14, 2003, pp. 1-84.*

(Continued)

*Primary Examiner*—William L Bashore
(74) *Attorney, Agent, or Firm*—Sughrue Mion, PLLC

(57) ABSTRACT

A system and method for time synchronization between multimedia content and segment metadata. Time synchronization system of the present invention includes a content processor receiving and storing multimedia content containing first segment time information; a metadata processor receiving and storing segment metadata for the content containing second segment time information; a synchronizer extracting the first segment time information from the multimedia content and the second segment time information from the metadata in response to a request of a user, determining respective reference time points from the first and second extracted segment time information, correcting a relative time point of the content using a difference between the determined reference time points, and synchronizing the received content and metadata using the corrected relative time point; and a content segment browser forwarding the content segment request signal to the synchronizer and reproducing a plurality of segments of the content synchronized by the synchronizer.

4 Claims, 11 Drawing Sheets

U.S. PATENT DOCUMENTS

| | | | |
|---|---|---|---|
| 6,640,145 B2 * | 10/2003 | Hoffberg et al. | 700/83 |
| 6,741,684 B2 * | 5/2004 | Kaars | 379/110.01 |
| 2001/0018693 A1 | 8/2001 | Jain et al. | |
| 2003/0067554 A1 * | 4/2003 | Klarfeld et al. | 348/461 |
| 2003/0159048 A1 * | 8/2003 | Matsumoto et al. | 713/178 |

OTHER PUBLICATIONS

Li L et al: "Multimedia segment delivery scheme and its performance for real-time synchronization control" Communications, 1994. ICC '94, Supercomm/ICC '94, Conference Record, 'Serving Humanity Through Communications.' IEE International Conference on New Orleans, LA, USA May 1-5, 1994, New York, NY, USA, IEE, May 1, 1994, pp. 1734-1738.

TV-Anytime: "Specification Series: S-3—Metdata—SP003v1.1", TV-Anytime Forum, Aug. 17, 2001.

Anonymous: "NTP System Implementation Model", Baynetworks.com, Sep. 29, 1997.

\* cited by examiner

```
< SegmentInformation  segmentId= "  seg-news9-1  ">
  < ProgramRef  crid="  crid://www.kbs.co.kr/news9  "/>
    < Description>
       < Title>   News/Politics/Presidential   Election  </ Title>
       < Synopsis>  Each  candidate  made  election  speech.  </ Synopsis>
    </ Description>
    < SegmentLocator>
       < MediaRefTimePoint>    PT10M12S</MediaRefTimePoint>
       < MediaDuration>  PT1M  </ MediaDuration>
    </ SegmentLocator>
    < KeyFrameLocator>
       < MediaRefTimePoint>   P10M20S  </ MediaRefTimePoint>
    </ KeyFrameLocator>
</ SegmentInformation>
```

FIG. 1A

```
< SegmentGroupInformation   groupId="  group-seg-news9  ">
    < ProgramRef  crid="  crid://www.kbs.co.kr/news9  "/>
    < GroupType>   Highlights  </ GroupType>
    < Description>
        <Title>  KBS 9  News  Group 1</Title>
        < Synopsis>  Group 1  consists  of  political  news  </ Synopsis>
    </ Description>
    < Segments  refList="  seg-news9-1     seg-news9-2  " />
</ SegmentGroupInformation>
```

FIG. 1B

```
< TimeBaseReference>
    < RefMediaTime>  </ RefMediaTime>
</ TimeBaseReference>
```

$T_{GPS}$ = (GPS reference time point value of content)
     − (GPS reference time point value of metadata)

$T_{DTS}$ = (DTS reference time point value of content)
     − (DTS reference time point value of metadata)

If ( $\Delta T_{GPS}$ >= 0 )
{
   If ( $\Delta T_{DTS}$ < 0 )
      $\Delta T_{DTS}$ = $\Delta T_{DTS}$ + $2^{33}$;
}
else
{
If ( $\Delta T_{DTS}$ > 0 )
   $\Delta T_{DTS}$ = $\Delta T_{DTS}$ − $2^{33}$;
}
return $\Delta T_{DTS}$

FIG. 5

$T_{GPS}$ = (GPS reference time point value of content)
         - (GPS reference time point value of metadata)
$T_{PTS}$ = (PTS reference time point value of content)
         - (PTS reference time point value of metadata)

If ( $\Delta T_{GPS}$ >= 0 )
{
  If ( $\Delta T_{PTS}$ < 0 )
    $\Delta T_{PTS}$ = $\Delta T_{PTS}$ + $2^{33}$;
}
else
{
If ( $\Delta T_{PTS}$ > 0 )
  $\Delta T_{PTS}$ = $\Delta T_{PTS}$ − $2^{33}$;
}
return $\Delta T_{PTS}$ Tc : content reference time point
Tm : segment metadata reference time point

SYSTEM AND METHOD FOR TIME SYNCHRONIZATION BETWEEN MULTIMEDIA CONTENT AND SEGMENT METADATA

BACKGROUND OF THE INVENTION

This application claims the priority of Korean Patent Application No. 10-2003-0043520 filed on Jun. 30, 2003, in the Korean Intellectual Property Office, the disclosure of which is incorporated herein by reference.

1. Field of Invention

Apparatuses and methods consistent with the present invention relate to time synchronization between multimedia content and segment metadata for multimedia content, and more particularly, to a system and method for synchronizing content and segment metadata received via different transmission channels using predetermined time information.

2. Description of the Related Art

As digital broadcasting services have become widely distributed, technical development for an effective application using multimedia contents (in the present invention, the various types of contents mentioned below are all regarded as multimedia contents) is highly required. For example, there is provided a personal video recorder (PVR) application, which provides a time shifting function for content broadcasted in real time by storing the broadcast contents therein. PVR may be a good example of a change in the way of viewing TV, in that it allows useful functions such as automatic commercial advance, instant replay, pause and trick play, which can be realized only in recording media such as video tapes and DVDs, to be applied to TV programs being broadcast in real time. The PVR application can have more powerful functions and provide users with more convenient functions, since it uses additional information, i.e. metadata, for broadcast contents. In particular, since segment metadata (in the present invention, metadata mentioned below are all regarded as segment metadata) is able to provide additional information such as highlights, tables of contents and bookmarks for the contents, users can view the broadcast contents in a desired, non-linear manner. For example, it is possible for users to view collected highlights of scoring scenes in a soccer game, to move and view again a desired second half of the third inning while viewing a first half of the seventh inning in a baseball game, to view only a desired news segment corresponding to a specific field in a news program, to firstly view desired songs of a specific singer in a show program, or the like. As mentioned above, a next generation PVR using segment metadata can provide users with a content segment browser which is a more convenient and powerful broadcast viewing tool.

As a representative standard for segment metadata, there is provided the "TV-Anytime Metadata" standard specified in the TV-Anytime Forum. This metadata standard expressed in an XML format defines the metadata for a segment and a segment group. FIG. 1A shows an example of metadata in which a segment is described. A segment is a unit representing a portion of contents, in which information such as segment ID, relevant broadcast program ID, descriptor for the segment, e.g. title/synopsis/keyword, and temporal positions of the segment and a key frame.

FIG. 1B shows an example of metadata in which a segment group is described. The segment group is a unit for grouping one or more segments from one or several broadcast programs. Group types for use in segment grouping are classified into highlights, highlights/objects, highlights/events, bookmarks, bookmarks/objects, bookmarks/events, themeGroup, preview, preview/title, preview/slideshow, tableOfContents, synopsis, shots, insertionPoints, alternativeGroups, other, and the like. If the group comprises only a group ID and the segment for one broadcast program other than the aforementioned group types, the metadata for the segment group defines information including a relevant broadcast program ID, a group descriptor such as title/synopsis/keyword, a group interval, a key frame position, IDs of segments belonging to the group, and the like.

A time point of each segment in segment metadata of TV-Anytime is described as a relative time point with respect to a start time point of the contents. Therefore, a reference time point to which the segment refers should be additionally described in the metadata. FIG. 1C shows an example of the metadata for representing such a reference time point.

At this time, if the aforementioned metadata are not provided simultaneously via the same transmission channel as that for the contents but provided via a different transmission channel by a content provider or another metadata provider, a time difference may be produced at the receiving device upon reception of the contents and metadata. Accordingly, a time synchronization process is required.

SUMMARY OF THE INVENTION

The present invention is conceived to solve the aforementioned problem, and proposes a system and method for performing time synchronization between content and metadata by setting predetermined time information and computing the set time information.

According to an aspect of the present invention for achieving the aspect, there is provided a time synchronization system, comprising a content processor for receiving and storing multimedia content containing first segment time information; a metadata processor for receiving and storing segment metadata for the content containing second segment time information; a synchronizer for extracting the first segment time information from the multimedia content and the second segment time information from the metadata in response to a content segment request signal of a user, determining respective reference time points from the first and second extracted segment time information, correcting a relative time point of the content using a difference between the determined reference time points, and synchronizing the received content and metadata using the corrected relative time point; and a content segment browser for forwarding the content segment request signal to the synchronizer and reproducing a plurality of segments of the content synchronized by the synchronizer.

In an exemplary embodiment, in a case where the time information is GPS time information and the reference time point is GPS time information, if a GPS value of the content is ahead of a GPS value of the metadata, the synchronizer corrects the relative time point of the content by adding a difference between the GPS values of the content and metadata to a relative time value in the metadata; or if the GPS value of the content is behind the GPS value of the metadata, the synchronizer corrects the relative time point of the content by subtracting the difference between the GPS values from the relative time value in the metadata.

In an exemplary embodiment, in a case where the time information is GPS and DTS time information and the reference time point is DTS time information, if a GPS value of the content is ahead of a GPS value of the metadata, the synchronizer causes $\Delta T_{DTS}$ to be changed to $\Delta T_{DTS} - 2^{33}$ as a new $\Delta T_{DTS}$ when $\Delta T_{DTS} > 0$ or $\Delta T_{DTS}$ to remain unchanged when $\Delta T_{DTS} < 0$ and then corrects the relative time point of the content by adding an absolute value of the $\Delta T_{DTS}$ to a relative time value in the metadata, where $\Delta T_{DTS}$ is a value obtained by subtracting the DTS time information value of the metadata from the DTS time information value of the content; or if the GPS value of the content is behind the GPS value of the metadata, the synchronizer causes $\Delta T_{DTS}$ to be changed to $\Delta T_{DTS}+2^{33}$ as a new $\Delta T_{DTS}$ when $\Delta T_{DTS}<0$ or $\Delta T_{DTS}$ to remain unchanged when $\Delta T_{DTS}>0$ and then corrects the relative time point of the content by subtracting an absolute value of the $\Delta T_{DTS}$ from the relative time value in the metadata, where $\Delta T_{DTS}$ is a value obtained by subtracting the DTS time information value of the metadata from the DTS time information value of the content.

In an exemplary embodiment, in a case where the time information is GPS and PTS time information and the reference time point is PTS time information, if a GPS value of the content is ahead of a GPS value of the, metadata, the synchronizer causes $\Delta T_{PTS}$ to be changed to $\Delta T_{PTS}-2^{33}$ as a new $\Delta T_{PTS}$ when $\Delta T_{PTS}>0$ or $\Delta T_{PTS}$ to remain unchanged when $\Delta T_{PTS}<0$ and then corrects the relative time point of the content by adding an absolute value of the $\Delta T_{PTS}$ to a relative time value in the metadata, where $\Delta T_{PTS}$ is a value obtained by subtracting the PTS time information value of the metadata from the PTS time information value of the content; or if the GPS value of the content is behind the GPS value of the metadata, the synchronizer causes $\Delta T_{PTS}$ to be changed to $\Delta T_{PTS}+2^{33}$ as a new $\Delta T_{PTS}$ when $\Delta T_{PTS}<0$ or $\Delta T_{PTS}$ to remain unchanged when $\Delta T_{PTS}>0$ and then corrects the relative time point of the content by subtracting an absolute value of the $\Delta T_{PTS}$ from the relative time value in the metadata, where $\Delta T_{PTS}$ is a value obtained by subtracting the PTS time information value of the metadata from the PTS time information value of the content.

According to another aspect of the present invention for achieving the aspect, there is provided a time synchronization method, comprising the steps of (1) receiving a multimedia content containing first segment time information and segment metadata for the multimedia content containing second segment time information for the multimedia content; (2) extracting the first segment time information from the received content and the second segment time information from the received metadata to determine their respective reference time points; (3) correcting a relative time point of the content using a difference between the determined reference time points; and (4) synchronizing the content and metadata received in step (1) using the corrected relative time point.

In an exemplary embodiment, in a case where the time information is GPS time information and the reference time point is GPS time information, if a GPS value of the content is ahead of a. GPS value of the metadata, step (3) comprises the step of correcting the relative time point of the content by adding a difference between the GPS values of the content and metadata to a relative time value in the metadata; or if the GPS value of the content is behind the GPS value of the metadata, step (3) comprises correcting the relative time point of the content by subtracting the difference between the GPS values from the relative time value in the metadata.

In an exemplary embodiment, in a case where the time information is GPS and DTS time information and the reference time point is DTS time information, if a GPS value of the content is ahead of a GPS value of the metadata, step (3) comprises the steps of (3-1) causing $\Delta T_{DTS}$ to be changed to $\Delta T_{DTS}-2^{33}$ as a new $\Delta T_{DTS}$ when $\Delta T_{DTS}>0$ or $\Delta T_{DTS}$ to remain unchanged when $\Delta T_{DTS}<0$ and (3-2) correcting the relative time point of the content by adding an absolute value of the $\Delta T_{DTS}$ to the relative time value in the metadata, where $\Delta T_{DTS}$ is a value obtained by subtracting the DTS time information value of the metadata from the DTS time information value of the content; or if the GPS value of the content is behind the GPS value of the metadata, step (3) comprises the steps of (3-1) causing $\Delta T_{DTS}$ to be changed to $\Delta T_{DTS}+2^{33}$ as a new $\Delta T_{DTS}$ when $\Delta T_{DTS}<0$ or $\Delta T_{DTS}$ to remain unchanged when $\Delta T_{DTS}>0$ and (3-2) correcting the relative time point of the content by subtracting an absolute value of the $\Delta T_{DTS}$ from the relative time value in the metadata, where $\Delta T_{DTS}$ is a value obtained by subtracting the DTS time information value of the metadata from the DTS time information value of the content.

In an exemplary embodiment, in a case where the time information is GPS and PTS time information and the reference time point is PTS time information, if a GPS value of the content is ahead of a GPS value of the metadata, step (3) comprises the steps of (3-1) causing $\Delta T_{PTS}$ to be changed to $\Delta T_{PTS}-2^{33}$ as a new $\Delta T_{PTS}$ when $\Delta T_{PTS}>0$ or $\Delta T_{PTS}$ to remain unchanged when $\Delta T_{PTS}<0$ and (3-2) correcting the relative time point of the content by adding an absolute value of the $\Delta T_{PTS}$ to a relative time value in the metadata, where $\Delta T_{PTS}$ is a value obtained by subtracting the PTS time information value of the metadata from the PTS time information value of the content; or if the GPS value of the content is behind the GPS value of the metadata, step (3) comprises the steps of (3-1) causing $\Delta T_{PTS}$ to be changed to $\Delta T_{PTS}+2^{33}$ as a new $\Delta T_{PTS}$ when $\Delta T_{PTS}<0$ or $\Delta T_{PTS}$ to remain unchanged when $\Delta T_{PTS}>0$ and (3-2) correcting the relative time point of the content by subtracting an absolute value of the $\Delta T_{PTS}$ from the relative time value in the metadata, where $\Delta T_{PTS}$ is a value obtained by subtracting the PTS time information value of the metadata from the PTS time information value of the content.

BRIEF DESCRIPTION OF THE DRAWINGS

The above and other aspects, features and advantages of the present invention will become apparent from the following description of exemplary embodiments given in conjunction with the accompanying drawings, in which:

FIG. 1A is a view illustrating metadata describing a content segment according to a prior art;

FIG. 1B is a view illustrating metadata describing a content segment group according to a prior art;

FIG. 1C is a view illustrating metadata describing a reference time point of a content segment according to a prior art;

FIG. 4 illustrates an algorithm for calculating $\Delta_{TDTS}$ when a reference time point is DTS according to an embodiment of the present invention;

FIG. 5 illustrates an algorithm for calculating $\Delta T_{PTS}$ when a reference time point is PTS according to an embodiment of the present invention;

DETAILED DESCRIPTION OF THE INVENTION

Hereinafter, a system and method for time synchronization between multimedia content and segment metadata according to an embodiment of the present invention will be described with reference to the accompanying drawings.

Figure 2:
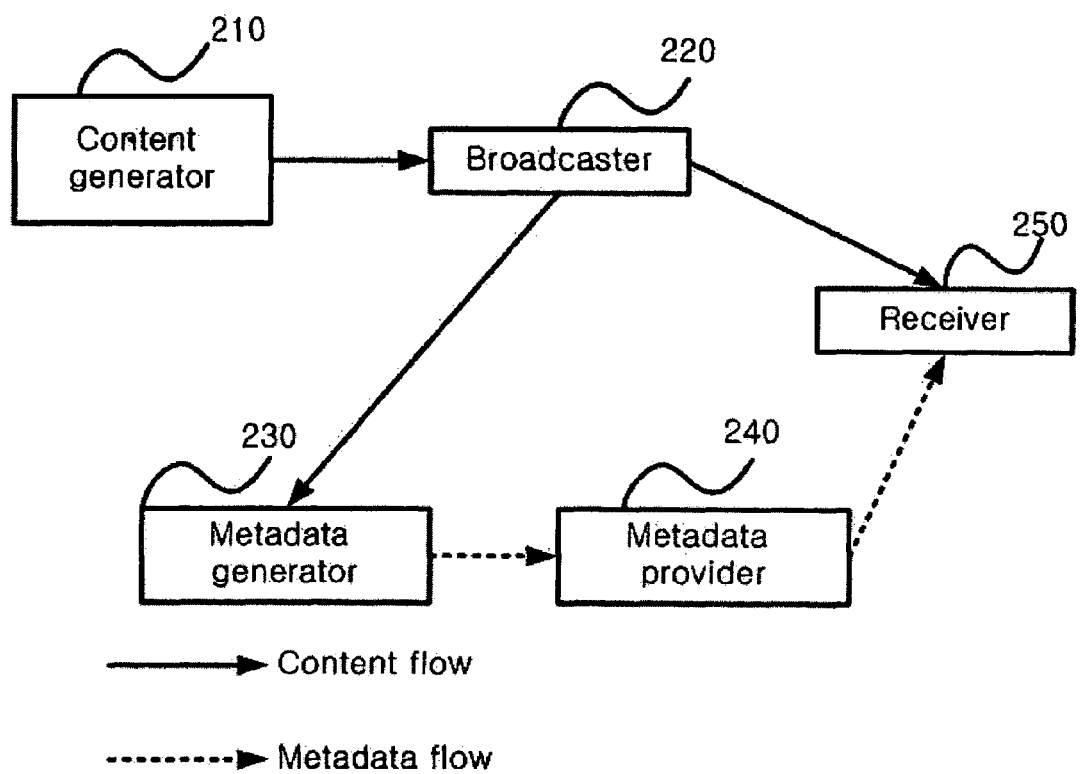
FIG. 2 is a view illustrating a flow of content and metadata in a digital television broadcast environment according to the present invention.

FIG. 2 is a view illustrating a flow of content and metadata in a digital television broadcast environment according to an embodiment of the present invention. Referring to FIG. 2, a content generator 210 generates content and provides the generated content to a broadcaster 220 such as a broadcasting station, which in turn broadcasts the received content. A metadata generator 230 receives the broadcast content, produces metadata for the received content, and then forwards the produced metadata to a metadata provider 240, which in turn sends the received metadata to a receiver 250. Furthermore, the receiver 250 receives the broadcast content from the broadcaster 220 via a different channel than the metadata transmission channel and performs segment browsing through time synchronization between the received content and the metadata received from the broadcaster 220. At this time, the metadata generator 230 additionally records time information, which will be a reference to the time described in the metadata to be produced, into a specific area of the metadata, and also the receiver 250 additionally stores time information which will be a reference when receiving the content from the broadcaster 220 and recording the received content. Because the reference time point recorded by the metadata generator 230 and the reference time point stored by the receiver 250 may be different from each other, the receiver 250 needs to correct the reference time point for time synchronization between the content and the metadata. Meanwhile, the broadcaster 220 and the metadata provider 240, which are shown in FIG. 2, may be the same as or different from each other, whereas the content and metadata transmission channels may be different and thus discriminated from each other.

Figure 3:
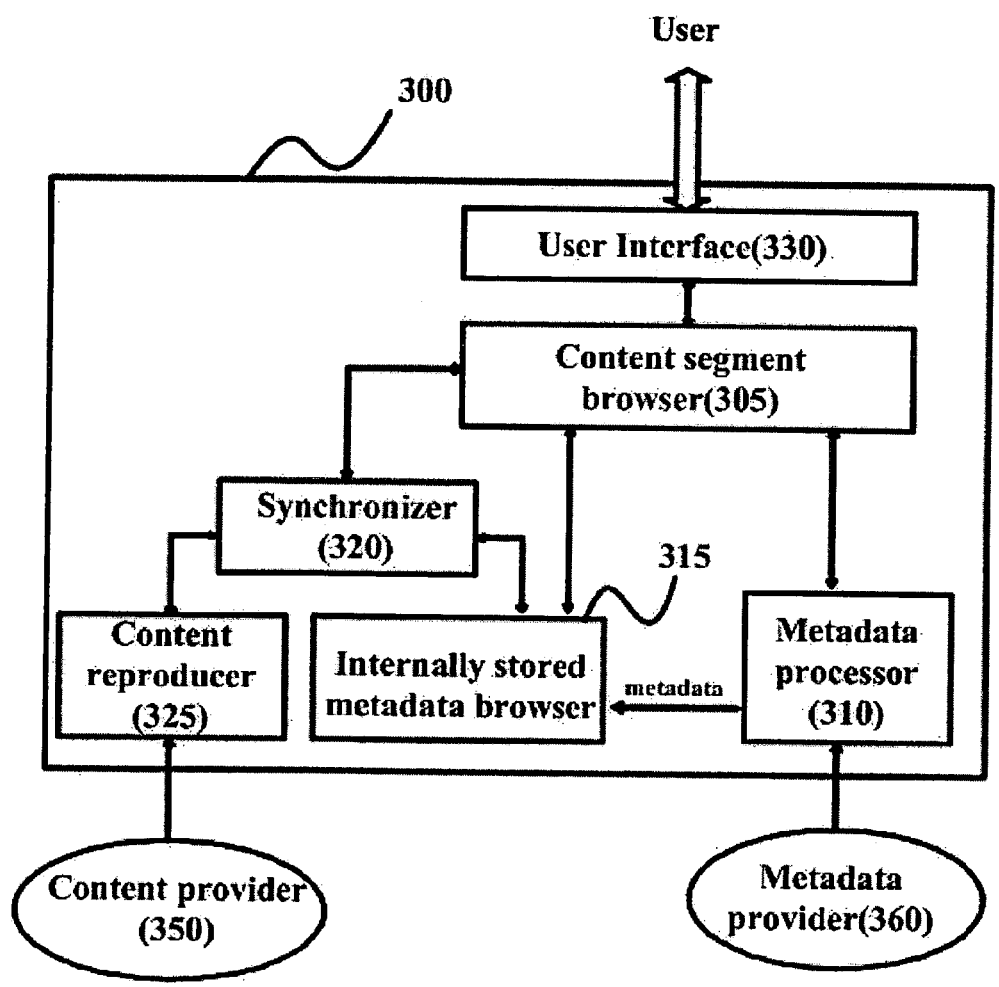
FIG. 3 is an internal block diagram of a receiver for synchronizing content and metadata and performing the content segment browsing according to the present invention.

FIG. 3 is an internal block diagram of a receiver 300 for synchronizing content and metadata and performing content segment browsing according to the present invention. Referring to FIG. 3, the receiver 300 comprises a metadata processor 310 for receiving metadata from a metadata provider 360 and processing the received metadata, a content reproducer 325 for receiving content from a content provider 350, an internally stored metadata browser 315 for storing metadata information, a synchronizer 320 for synchronizing information on the content and metadata, a content segment browser 305 for performing content segment browsing at the request of a user, and a user interface 330 for receiving browsing instructions from the user and forwarding the received instructions to the content segment browser 305. Then, the content provider 350 may include both the content generator 210 and the broadcaster 220 shown in FIG. 2, and the metadata provider 360 may include the metadata generator 230 and the metadata provider 240 shown in FIG. 2. The content reproducer 325 functions to receive content from the content provider 350 and reproduce or store the received content. Furthermore, the metadata processor 310 receives segment metadata for content that the content reproducer 325 has received from the metadata provider 360, and forwards the received segment metadata to the internally stored metadata browser 315. At this time, the internally stored metadata browser 315 extracts necessary field data by parsing the received metadata and stores the extracted data in a given data storage format. The content segment browser 305 is an application present in the receiver 300 for performing content segment browsing and forwards a control signal containing information on the segment or segment group selected by the user to the synchronizer 320 in response to user instructions received from the user interface 330. Then, the synchronizer 320 extracts the content, which the user has selected, from the content reproducer 325 and also extracts the metadata information for the content from the internally stored metadata browser 315 so as to synchronize the content and the metadata information and forward the synchronized information to the content segment browser 305. Thereafter, the content segment browser 305 performs segment browsing using the synchronized content and metadata information. Thus, the present invention is directed to a method for allowing the synchronizer 320 to perform time synchronization between the content and the metadata in the receiver 300 so constructed.

To perform the time synchronization between content and metadata, the synchronizer 320 requires reference time information. That is, since the metadata generator 230 and the receiver 250 receive content via separate transmission channels as illustrated in FIG. 2, the respective reference times may be different from each other. Thus, if the receiver 250 intends to perform time synchronization between the content stored in the receiver 250 and the metadata generated by the metadata generator 230 and received from the metadata provider 240, it is necessary to use a common reference time format.

The present invention suggests DTS/PTS (decoding time stamp/presentation time stamp) information of a PES (packetized elementary stream) packet provided by the MPEG-2 based digital TV broadcast and standard time information defined in the digital broadcast standard such as ATSC or DVB, as reference time information for use in the time synchronization.

DTS and PTS are time information inserted in MPEG-2 PES packets, and represent a reference time for use in synchronous decoding and presentation of video/audio streams. DTS and PTS consist of 33 bits and are updated 90,000 times per second. Further, DTS and PTS are not inserted in all PES packets. DTS and PTS are contained in PES packet headers and transmitted every about 0.7 second. In addition, the values of DTS and PTS are reset every 24 hours, and thus, DTS and PTS can be used as time identification information only in 24 hours.

Meanwhile, the digital broadcast standard based on the MPEG-2 system standard is generally classified into American ATSC and European DVB. ATSC extensively defines a PSIP (program and system information protocol) standard in a PSI (program specific information) section specified in the MPEG-2 system. In the PSIP standard, a reference time is transmitted by a 32-bit field value of "system_time" in STT (system time table). This field value represents a lapse time in seconds from a reference time which is Jan. 6, 1980, 0:00:00 AM (hereinafter, referred to as "GPS" to refer the Global Positioning System time). STT is designed to be transmitted once every second. Tolerance from an exact time is within +/−4 seconds and is recommended to be less than a second. Unlike DTS and PTS, STT represents reference time information in real life. Similar to ATSC, DVB defines a SI (system information) standard under the MPEG-2 system standard, and also defines TDT (time and date table) and TOT (time offset table) tables so as to represent a reference time in the standard.

As described above, there is a disadvantage in that the DTS/PTS time information of MPEG-2 can perform correct time synchronization for any time within 24 hours but cannot perform time synchronization for any time over 24 hours. Furthermore, there is a disadvantage in that any one point in the content cannot be correctly specified, because the "system_time" field of STT provided by ATSC has been set to a time when a relevant TS packet including STT reaches a decoder and its tolerance has been defined as within 4 seconds. That is, the value of STT corresponding to a point intended by a metadata server side may indicate a different point in a set-top box for decoding the content. Therefore, it is suggested in the present invention that the GPS time provided in ATSC or DVB be used as a reference time for time synchronization or that GPS time be used together with DTS and PTS values present in the MPEG-2 PES packet to specify an exact point of interest by a user. In such a case, there is an advantage in that because DTS/PTS values are essentially used for synchronization for audio and video frames, an exact point of any frame in the content can be specified. However, since each of DTS and PTS is not an actual time but a virtual time unit reset every 24 hours, some errors may occur during synchronization. These errors can be prevented by using the GPS time information provided in ATSC or DVB. That is, in the present invention, the reference time for synchronization between content and metadata is described using three kinds of information such as the DTS, PTS and GPS time.

The receiver 250, such as a set-top box, stores an instantaneous time when the content received from the broadcaster 220 is stored for performing subsequent synchronization with the metadata. This instantaneous time is defined as a reference time point of content, which in turn is expressed as a combination of the aforementioned DTS, PTS and GPS times.

Meanwhile, the metadata generator 230 receives content from the broadcaster 220 and records an instantaneous time when the metadata for the received content is written, into the specific area of the metadata. This time is defined as the reference time point of metadata, which in turn is expressed as a combination of the aforementioned DTS, PTS and GPS times. At this time, the reference time point of metadata may be classified and defined by using the following two methods: i.e., the first method in which a reference time point value is set once, and a start time point of each segment described in the metadata is represented by the relative difference with respect to the set reference time point, and the second method in which a start time point of each segment is represented by an independent reference time point without setting an additional reference time point.

According to the present invention, even though the reference time point of content or metadata contains three fields of GPS, DTS and PTS, the receiver 250 selects only one of the three fields and uses the selected field as a reference time point when performing synchronization between the content and metadata. More accurate synchronization can be made by using DTS and PTS than using GPS. However, when the difference between the GPS values of the content and metadata is greater than 24 hours, the DTS and PTS values are not suitable to be used as a reference time point. This is because an operation, in which the GPS values increase from 0 to $(2^{33}-1)$ and then reset back to 0, is repeated every about 24 hours. In such a case, therefore, the time should be corrected using only GPS, even though it may cause some errors. When the difference between GPS values is less than 24 hours, either DTS or PTS is used as the reference time for accurate time correction.

As described above, since the reference time of content recorded by the receiver 250 and the reference time of metadata produced by the metadata generator 230 may be different from each other, it is necessary for the receiver 250 to correct the reference time in order to perform time synchronization for the content and metadata.

Assuming that the difference between the reference time points of content and metadata is ΔT, in the present invention, when the reference time point includes GPS, DTS and PTS, the difference thereof is defined as $\Delta T_{GPS}$, $\Delta T_{DTS}$ and $\Delta T_{PTS}$, respectively.

That is, if the reference time point is GPS, the difference thereof can be defined as the following equation:

$$\Delta T_{GPS} = \text{(GPS reference time point value of content)} - \text{(GPS reference time point value of metadata)} \quad (1)$$

where the unit used is a second.

If the reference time point is DTS or PTS, it should be determined whether the reference time point of content is ahead of or is behind the reference time point of the metadata on the basis of the GPS value. This is because an operation, in which 32-bit length values of DTS and PTS increase from 0 to $(2^{33}-1)$ in a Round-Robin manner and then are reset to 0, is repeated, and thus, it cannot be determined which reference time point is ahead of the other reference time point based on using such a simple difference.

FIG. 4 illustrates an algorithm for calculating $\Delta T_{DTS}$ when the reference time point is DTS, and FIG. 5 illustrates an algorithm for calculating $\Delta_{TPTS}$ when the reference time point is PTS. In each case, it is first checked which one of the metadata and content is ahead of the other by calculating $\Delta T_{GPS}$, and $\Delta T_{DTS}$ and $\Delta T_{PTS}$ are then corrected according to the checked result, and $\Delta T_{DTS}$ and $\Delta T_{PTS}$ are finally returned.

Next, a method of correcting relative time points in a case where time points of respective segments described in metadata are specified as the relative time points, i.e. offsets, with respect to a reference time of metadata will be described.

Figure 6A:
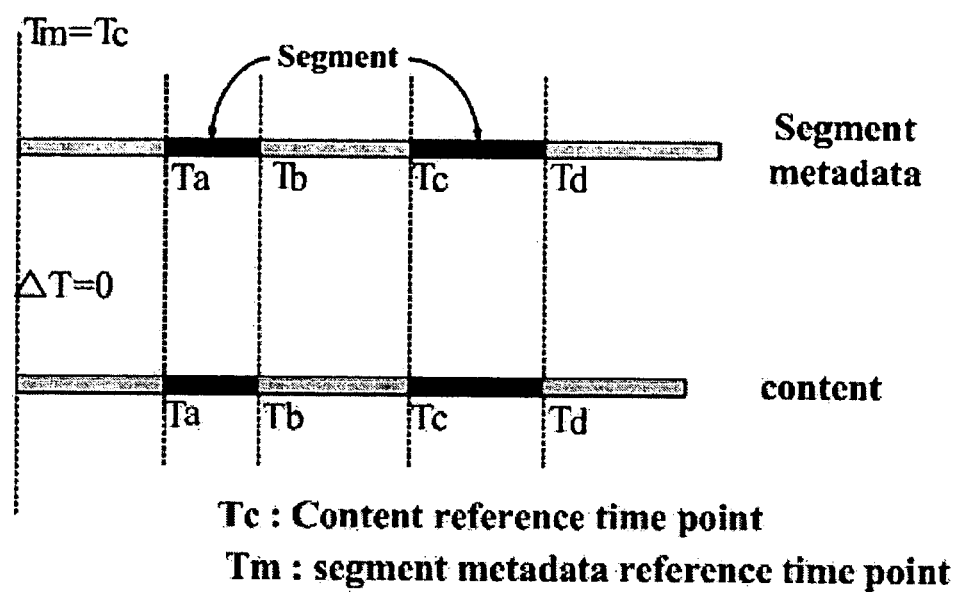
FIG. 6A is a diagram illustrating a method for correcting relative time points in a case where reference time points of content and metadata match according to the present invention.

FIG. 6A is a diagram illustrating a method for correcting the relative time points in a case where the reference time points of content and metadata coincide with each other. In such a case, since the reference time points are the same as each other, it is not necessary to correct the relative time points of the segments.

Figure 6B:
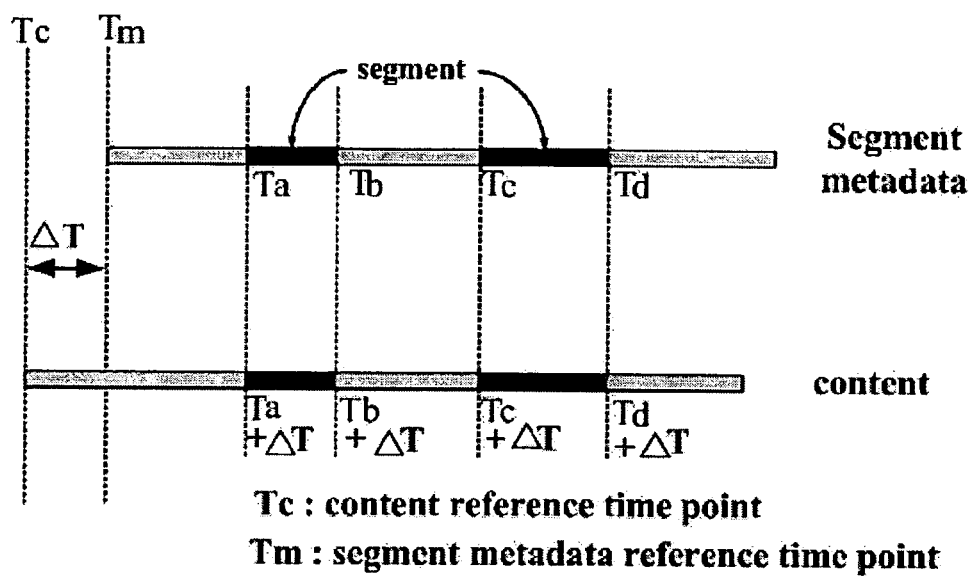
FIG. 6B is a diagram illustrating a method for correcting relative time points in a case where a reference time point of content is ahead of a reference time point of metadata according to the present invention.

FIG. 6B is a diagram illustrating a method for correcting the relative time points in a case where the reference time point of content is ahead of the reference time point of metadata. In such a case, segment browsing will be performed based on time values obtained by adding an absolute value of ΔT to the relative time information such as Ta, Tb, Tc and Td for the respective segments described in the metadata with respect to the reference time point of metadata.

Figure 6C:
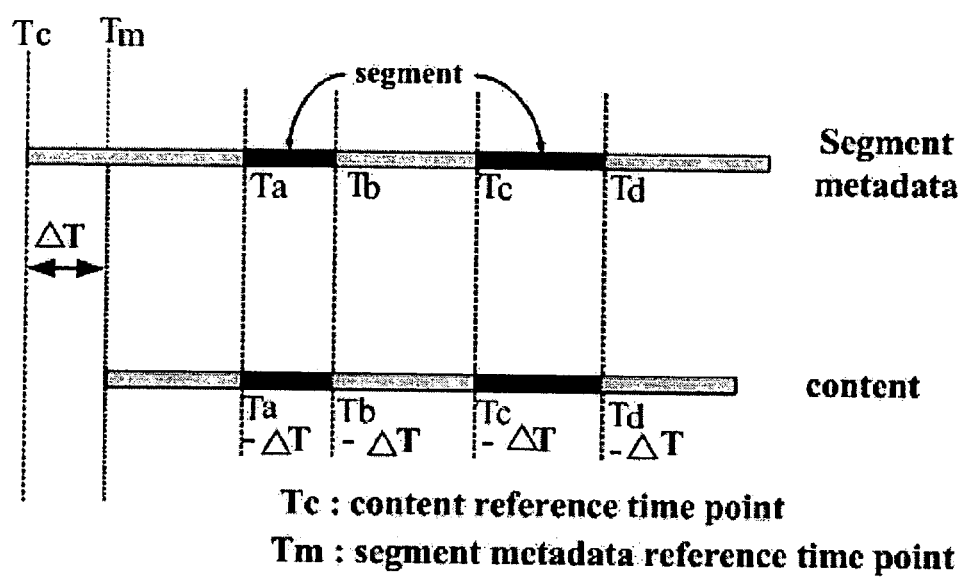
FIG. 6C is a diagram illustrating a method for correcting relative time points in a case where a reference time point of content is behind a reference time point of metadata according to the present invention.

FIG. 6C is a diagram illustrating a method for correcting the relative time points in a case where the reference time point of content is behind the reference time point of metadata. In such a case, segment browsing will be performed based on time values obtained by subtracting an absolute value of ΔT from the relative time information such as Ta, Tb, Tc and Td for the respective segments described in the metadata with respect to the reference time point of metadata.

Figure 6D:
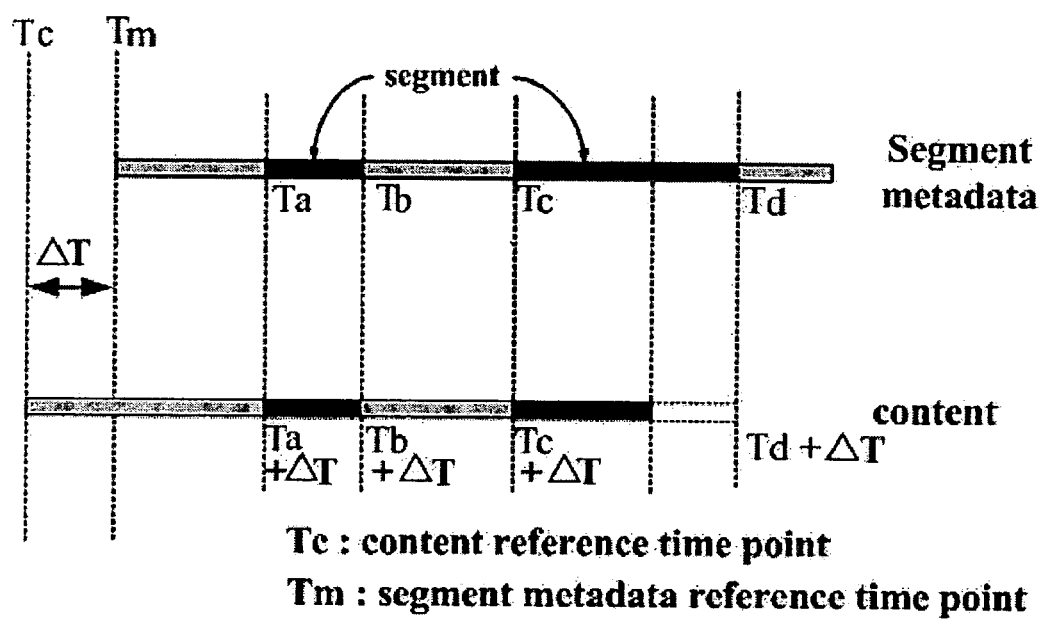
FIG. 6D is a diagram illustrating a case where overflow is generated in any time interval according to the present invention.

FIG. 6D is a diagram illustrating a case where an overflow is generated in any time interval. That is, if the time interval of a given segment specified in the segment metadata exceeds a corresponding time interval of the content stored in a receiving device after the reference time point has been corrected, the content is reproduced only within the range of the time interval thereof.

According to the present invention so constructed, there is an advantage in that differences between reference time points of content and metadata, which may be produced when producing metadata for a predetermined content, can be corrected, whereby an user can perform segment browsing for the content even in an environment in which the transmission channels of the content and segment metadata are separate from each other.

As described above, it will be apparent to those skilled in the art that various substitutions, changes and modifications may be made thereto without departing from the technical spirit and scope of the invention. Thus, it should be understood that the present invention is not limited to the aforementioned embodiments illustrated in the accompanying drawings.

What is claimed is:

1. A time synchronization system, comprising:

a content processor receiving and storing multimedia content containing first segment time information as received content;

a metadata processor receiving and storing segment metadata for the received content containing second segment time information as received metadata;

a synchronizer extracting the first segment time information from the received content and the second segment time information from the received metadata in response to a content segment request signal of a user as first extracted segment time information and as second extracted segment time information, determining a first reference time point and a second reference time point from the first and the second extracted segment time information, respectively, correcting a relative time point of the received content using a difference between the first and the second reference time points as a corrected relative time point, and synchronizing the received content and metadata using the corrected relative time point; and a content segment browser for forwarding the content segment request signal to the synchronizer and reproducing a plurality of segments of the received content synchronized by the synchronizer, wherein the first segment time information comprises a first Global Positioning System (GPS) time information and a first decoding time stamp (DTS) time information, the second segment time information comprises a second GPS time information and a second DTS time information, and the first and the second reference time points are the first and the second DTS time information, respectively, and wherein:

if the first GPS time information of the received content is ahead of the second GPS time information of the received metadata, the synchronizer causes a difference between the first and the second DTS time information ($\Delta T_{DTS}$) to be changed to $\Delta T_{DTS} - 2^{33}$ as a new $\Delta T_{DTS}$ when the $\Delta T_{DTS} > 0$ or the $\Delta T_{DTS}$ to remain unchanged when the $\Delta T_{DTS} < 0$ and then corrects the relative time point of the received content by adding an absolute value of the $\Delta T_{DTS}$ to a relative time value in the received metadata, where the $\Delta T_{DTS}$ is a value obtained by subtracting the second DTS time information of the received metadata from the first DTS time information of the received content; or if the first GPS time information of the received content is behind the second GPS time information of the received metadata, the synchronizer causes the $\Delta T_{DTS}$ to be changed to $\Delta T_{DTS} + 2^{33}$ as the new $\Delta T_{DTS}$ when the $\Delta T_{DTS} < 0$ or the $\Delta T_{DTS}$ to remain unchanged when the $\Delta T_{DTS} > 0$ and then corrects the relative time point of the received content by subtracting an absolute value of the $\Delta T_{DTS}$ from the relative time value in the received metadata, where the $\Delta T_{DTS}$ is a value obtained by subtracting the second DTS time information value of the received metadata from the first DTS time information value of the received content.

2. A time synchronization system, comprising:

a content processor receiving and storing multimedia content containing first segment time information as received content;

a metadata processor receiving and storing segment metadata for the received content containing second segment time information as received metadata;

a synchronizer extracting the first segment time information from the received content and the second segment time information from the received metadata in response to a content segment request signal of a user as first extracted segment time information and as second extracted segment time information, determining a first reference time point and a second reference time point from the first and the second extracted segment time information, respectively, correcting a relative time point of the received content using a difference between the first and the second reference time points as a corrected relative time point, and synchronizing the received content and metadata using the corrected relative time point; and a content segment browser for forwarding the content segment request signal to the synchronizer and reproducing a plurality of segments of the received content synchronized by the synchronizer, wherein the first segment time information comprises a first Global Positioning System (GPS) time information and a first presentation time stamp (PTS) time information, the second segment time information comprises a second GPS time information and a second PTS time information, and the first and the second reference time points are the first and the second PTS time information, respectively, and wherein:

if the first GPS time information of the received content is ahead of the second GPS time information of the received metadata, the synchronizer causes a difference between the first and the second PTS ($\Delta T_{PTS}$) to be changed to $\Delta T_{PTS} - 2^{33}$ as a new $\Delta T_{PTS}$ when the $\Delta T_{PTS} > 0$ or the $\Delta T_{PTS}$ to remain unchanged when the $\Delta T_{PTS} < 0$ and then corrects the relative time point of the received content by adding an absolute value of the $\Delta T_{PTS}$ to a relative time value in the received metadata, where the $\Delta T_{PTS}$ is a value obtained by subtracting the second PTS time information value of the received metadata from the first PTS time information value of the received content; or if the first GPS time information of the received content is behind the second GPS time information of the received metadata, the synchronizer causes the $\Delta T_{PTS}$ to be changed to $\Delta T_{PTS} + 2^{33}$ as the new $\Delta T_{PTS}$ when the $\Delta T_{PTS} < 0$ or the $\Delta T_{PTS}$ to remain unchanged when the $\Delta T_{PTS} > 0$ and then corrects the relative time point of the received content by subtracting an absolute value of the $\Delta T_{PTS}$ from the relative time value in the received metadata, where the $\Delta T_{PTS}$ is the value obtained by subtracting the second PTS time information value of the received metadata from the first PTS time information value of the received content.

3. A time synchronization method, comprising:
(1) receiving a multimedia content containing first segment time information as received content and segment metadata for the multimedia content containing second segment time information for the multimedia content as received metadata;
(2) extracting the first segment time information from the received content and the second segment time information from the received metadata to determine a first reference time point and a second reference time point, respectively;
(3) correcting a relative time point of the received content using a difference between the first and the second reference time points to generate a corrected relative time point; and
(4) synchronizing the received content and received metadata received in (1) using the corrected relative time point,
wherein the first segment time information comprises a first Global Positioning System (GPS) time information and a first decoding time stamp (DTS) time information, the second segment time information comprises a second GPS time information and a second DTS time information, and the first and the second reference time points are the first and the second DTS time information, respectively, and wherein:
if the first GPS time information of the received content is ahead of the second GPS time information of the received metadata,
(3) comprises (3-1) causing a difference between the first and the second DTS time information ($\Delta T_{DTS}$) to be changed to $\Delta T_{DTS} - 2^{33}$ as a new $\Delta T_{DTS}$ when the $\Delta T_{DTS} > 0$ or the $\Delta T_{DTS}$ to remain unchanged when the $\Delta T_{DTS} < 0$ and (3-2) correcting the relative time point of the received content by adding an absolute value of the $\Delta T_{DTS}$ to the relative time value in the received metadata, where the $\Delta T_{DTS}$ is a value obtained by subtracting the second DTS time information value of the received metadata from the first DTS time information value of the received content; or
if the first GPS time information of the received content is behind the second GPS time information of the received metadata,
(3) comprises (3-1) causing the $\Delta T_{DTS}$ to be changed to $\Delta T_{DTS} + 2^{33}$ as the new $\Delta T_{DTS}$ when the $\Delta T_{DTS} < 0$ or the $\Delta T_{DTS}$ to remain unchanged when the $\Delta T_{DTS} > 0$ and (3-2) correcting the relative time point of the received content by subtracting an absolute value of the $\Delta T_{DTS}$ from the relative time value in the received metadata, where the $\Delta T_{DTS}$ is a value obtained by subtracting the second DTS time information value of the received metadata from the first DTS time information value of the received content.

4. A time synchronization method, comprising:
(1) receiving a multimedia content containing first segment time information as received content and segment metadata for the multimedia content containing second segment time information for the multimedia content as received metadata;
(2) extracting the first segment time information from the received content and the second segment time information from the received metadata to determine a first reference time point and a second reference time point, respectively;
(3) correcting a relative time point of the received content using a difference between the first and the second reference time points to generate a corrected relative time point; and
(4) synchronizing the received content and received metadata received in (1) using the corrected relative time point,
wherein the first segment time information comprises a first Global Positioning System (GPS) time information and a first presentation time stamp (PTS) time information, the second segment time information comprises a second GPS time information and a second PTS time information, and the first and the second reference time points are the first and the second PTS time information, respectively, and wherein:
if the first GPS time information of the received content is ahead of the second GPS time information of the received metadata,
(3) comprises (3-1) causing a difference between the first and the second PTS ($\Delta T_{PTS}$) to be changed to $\Delta T_{PTS} - 2^{33}$ as a new $\Delta T_{PTS}$ when the $\Delta T_{PTS} > 0$ or the $\Delta T_{PTS}$ to remain unchanged when the $\Delta T_{PTS} < 0$ and (3-2) correcting the relative time point of the received content by adding an absolute value of the $\Delta T_{PTS}$ to a relative time value in the received metadata, where the $\Delta T_{PTS}$ is a value obtained by subtracting the second PTS time information value of the received metadata from the first PTS time information value of the received content; or
if the first GPS time information of the received content is behind the second GPS time information of the received metadata,
(3) comprises (3-1) causing the $\Delta T_{PTS}$ to be changed to $\Delta T_{PTS} + 2^{33}$ as the new $\Delta T_{PTS}$ when the $\Delta T_{PTS} < 0$ or $\Delta T_{PTS}$ to remain unchanged when the $\Delta T_{PTS} > 0$ and (3-2) correcting the relative time point of the received content by subtracting an absolute value of the $\Delta T_{PTS}$ from the relative time value in the received metadata, where the $\Delta T_{PTS}$ is a value obtained by subtracting the second PTS time information value of the received metadata from the first PTS time information value of the received content.

* * * * *